United States Patent
Dale

(10) Patent No.: US 12,028,252 B2
(45) Date of Patent: *Jul. 2, 2024

(54) SELECTIVE ROUTE DOWNLOAD TRAFFIC SAMPLING

(71) Applicant: Arista Networks, Inc., Santa Clara, CA (US)

(72) Inventor: Lincoln Travis Dale, Santa, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 428 days.

This patent is subject to a terminal disclaimer.

(21) Appl. No.: 17/373,240

(22) Filed: Jul. 12, 2021

(65) Prior Publication Data

US 2021/0344597 A1 Nov. 4, 2021

Related U.S. Application Data

(63) Continuation of application No. 14/967,084, filed on Dec. 11, 2015, now Pat. No. 11,063,870.

(51) Int. Cl.
*H04L 45/748* (2022.01)
*H04L 45/00* (2022.01)

(52) U.S. Cl.
CPC ............ *H04L 45/748* (2013.01); *H04L 45/38* (2013.01)

(58) Field of Classification Search
CPC ............................... H04L 45/748; H04L 45/38
See application file for complete search history.

(56) References Cited

U.S. PATENT DOCUMENTS

| 11,063,870 B2* | 7/2021 | Dale ..................... H04L 45/748 |
| 2007/0097973 A1* | 5/2007 | Scudder .................. H04L 45/54 370/465 |
| 2009/0109852 A1 | 4/2009 | Grover et al. |
| 2012/0294166 A1 | 11/2012 | Punati et al. |
| 2014/0013324 A1 | 1/2014 | Zhang et al. |
| 2014/0119379 A1 | 5/2014 | Liang et al. |
| 2014/0254605 A1 | 9/2014 | Anumala et al. |
| 2014/0369209 A1 | 12/2014 | Khurshid et al. |
| 2015/0117459 A1 | 4/2015 | Liu et al. |
| 2015/0117495 A1 | 4/2015 | Tiruvuru et al. |
| 2015/0326439 A1 | 11/2015 | Smith et al. |
| 2015/0365495 A1 | 12/2015 | Fan et al. |
| 2016/0197831 A1 | 7/2016 | De Foy et al. |

* cited by examiner

*Primary Examiner* — Natasha W Cosme
*Assistant Examiner* — Yewon Kim
(74) *Attorney, Agent, or Firm* — Sprinkle IP Law Group

(57) ABSTRACT

A network device includes a forwarding information base (FIB). The FIB includes a first number of entries and a default entry. The network device includes a routing information base that includes a second number of entries. The network device includes a FIB entry optimizer that ranks a first portion of the second number of entries based on access information of the first number of entries; ranks a second portion of the second number of entries based on access information of the default entry; and updates at least one entry of the FIB based on the ranks of the first portion of the second number of entries and the ranks of the second portion of the second number of entries. The first number of entries is less than the second number of entries.

20 Claims, 6 Drawing Sheets

SELECTIVE ROUTE DOWNLOAD TRAFFIC SAMPLING

This application is a continuation of, and claims a benefit of priority under 35 U.S.C. 120, of U.S. patent application Ser. No. 14/967,084 filed Dec. 11, 2015, now U.S. Pat. No. 11,063,870, entitled "SELECTIVE ROUTE DOWNLOAD TRAFFIC SAMPLING, which is hereby incorporated herein for all purposes.

BACKGROUND

Network infrastructure such as routers or switches may receive packets and forward them to facilitate network communications. The network infrastructure may be connected by a number of operable connections to other pieces of network infrastructure. The network infrastructure may include a forwarding information base (FIB). The FIB may include information that enables the network infrastructure to forward received packets to a recipient, identified by the packet, by the operable connections.

SUMMARY

In one aspect, a method of programming a forwarding information base in accordance with one or more embodiments of the invention includes comparing, by a forwarding information base entry optimizer, a first ranking of a first entry of a routing information base (RIB) not associated with any entry of a forwarding table of a FIB to a second ranking of a second entry of the RIB that is associated with a first entry of the FIB; making a first determination, by the FIB entry optimizer, that the first ranking is greater than the second ranking based on the comparison; deprogramming, by the FIB entry optimizer, the first entry of the FIB in response to the first determination; and programming, by the FIB entry optimizer, a first new entry of the FIB based on the first entry of the RIB. The first ranking is greater than the second ranking.

In one aspect, a network device in accordance with one or more embodiments of the invention includes a forwarding information base. The FIB includes a first plurality of entries and a default entry. The network device includes a routing information base that includes a second plurality of entries. The network device includes a FIB entry optimizer that ranks a first portion of the second plurality of entries based on access information of the first plurality of entries; ranks a second portion of the second plurality of entries based on access information of the default entry; and updates at least one entry of the FIB based on the ranks of the first portion of the second plurality of entries and the ranks of the second portion of the second plurality of entries. The first plurality of entries is less than the second plurality of entries.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for programming a forwarding information base (FIB) of a network device. The network device may be a router, switch, multilayer switch, or other device that may support network communications. To support network communications, the network device may be configured to receive packets, identify a recipient of the packets, and forward the received packets towards the identified recipient. The FIB may include information required to forward the received packets towards the recipient. The network device may be a part of a network (e.g., a local area network, a wide area network, the Internet, etc.).

In one or more embodiments of the invention, the network device may include a FIB entry optimizer. The FIB entry optimizer may be configured to program the FIB. The FIB entry optimizer may program entries of the FIB based on an access rate of one or more entries of the FIB and/or an estimated access rate of one or more entries of a routing information base (RIB) that are not associated with one or more entries of the FIB, e.g., entries of the RIB that do not have corresponding entries of the FIB.

Figure 1:
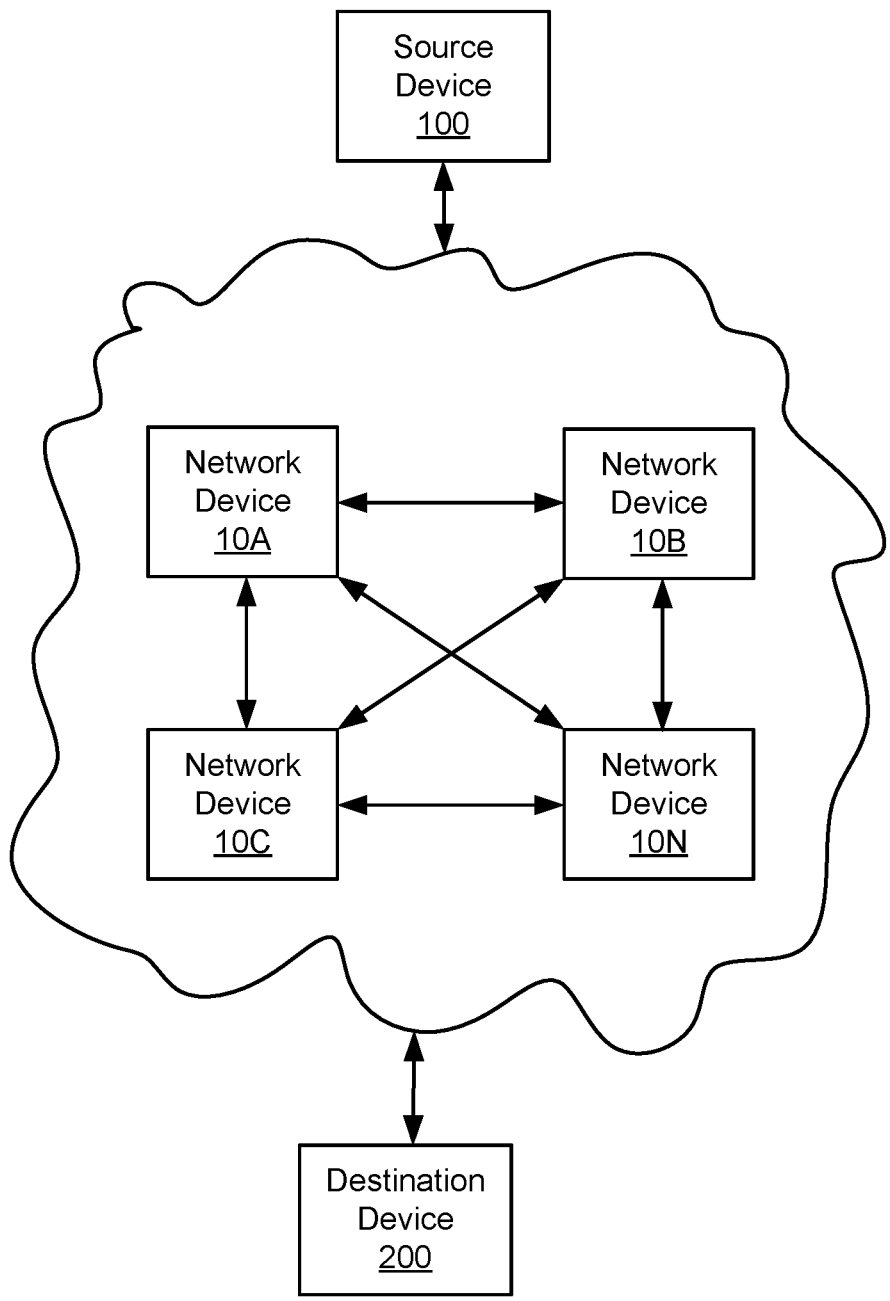
FIG. 1 shows a system in accordance with one or more embodiments of the invention.

FIG. 1 shows an example of a network in accordance with one or more embodiments of the invention. The example network shown in FIG. 1 includes a source device (100), a destination device (200), and network devices (10A-10N). Each of the aforementioned devices may be interconnected by a communication network supporting one or more networking protocols. For example, network device 10A may be connected by operable communication links to network devices 10B, 10C, and 10N as indicated by the arrows. The network may include any number of source devices, destination devices, and network devices without departing from the invention. Additionally, each of the aforementioned devices may include any number of communication links without departing from the invention. In one embodiment of the invention, the network may be the Internet.

In one or more embodiments of the invention, a source device (100) may communicate with a destination device (200) using one or more networking protocols. More specifically, the source device (100) may generate a packet that identifies the destination device (200) and send the packet to one of the network devices (10A-10N). Upon receipt of the packet, the network device (10A-10N) may determine a communication link on which to forward the packet based on the information included in a FIB (not shown) of the network device (10A-10N).

For example, network device 10A may receive the packet from the source device. Network device 10A may include three communication links to network devices 10B, 10C, and 10N, respectively. Network device 10A may determine to which of network devices 10B, 10C, and 10N to forward the packet based on the destination device (200) identified by the packet and the information included in the FIB.

Figure 2A:
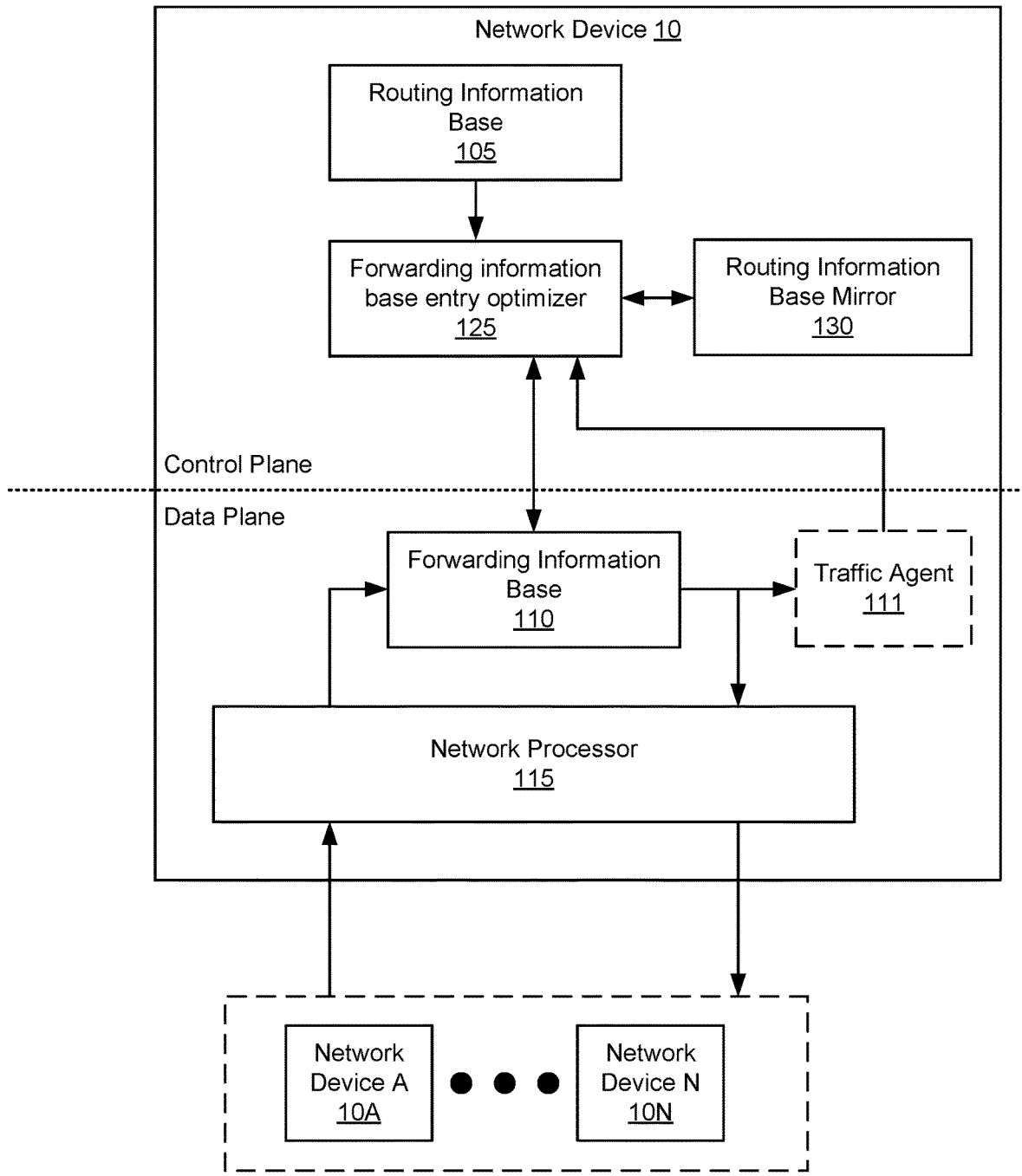
FIG. 2A shows a network device in accordance with one or more embodiments of the invention.

FIG. 2A shows a network device (10) in accordance with one or more embodiments of the invention. The network device (10) may be configured to receive and forward packets in accordance with one or more networking protocols.

The network device (10) may be a physical device that includes non-transitory storage, memory (e.g. Random Access Memory), and one or more processors. The non-transitory storage may include instructions which, when executed by the one or more processors, enable the network device (10) to perform the functions described in this application and shown in FIGS. 3-5.

The network device (10) may include a network processor (115), a forwarding information base (FIB) (110), a traffic agent (111), a routing information base (RIB) (105), a forwarding information base entry optimizer (125), and a routing information base mirror (130). Each of the components of the network device (10) is described below.

In one or more embodiments of the invention, the network processor (115) may be a physical device that includes functionality to enable the network device to communicate with other devices (e.g., other network devices, source devices, and/or destination devices) using one or more networking protocols. The network processor (115) may be configured to receive packets from one or more devices and forward the received packets to other components of the network device (10). Further, the network processor (115) may be configured to receive packets from components of the network device (10) and forward the packets to one or more devices. The network processor may be, for example, an embedded hardware device. For example, the embedded hardware device may be a field programmable gate array (FPGA), application specific integrated circuit (ASIC), and/or digital signal processor (DSP). Other embedded hardware devices may be used without departing from the invention.

In one or more embodiments of the invention, the network processor (115) may be configured to identify packets received from devices that are to be forwarded to other devices. Upon identification of a to-be-forwarded packet, the network processor (115) may retrieve, from the FIB, information that identifies to which device the to-be-forwarded packet is to be sent.

To enable the network device (10) to perform packet forwarding, the network device may include a RIB (105) and a FIB (110). The RIB and FIB may be/include data structures that include information related to the topology of a network. The RIB and FIB may be stored on the network device.

In one embodiment of the invention, the RIB may be a database that lists all routes to destinations in a network that are accessible from the network device. The RIB may be continuously or periodically updated by the network device (10) or an external source such as a network controller (not shown) as the topology of a network changes. The RIB (105) may include statistical information relating to the routes. The statistical information may classify the quality of potential routes to destinations in the network. In one or more embodiments of the invention, the RIB may operate in a control plane of the network device.

While the RIB may include all of the necessary information to forward a packet, e.g., the routes, it is computationally costly to determine packet forwarding by a RIB. To reduce the computational cost of forwarding a packet, the network device may include a FIB.

Figure 2B:
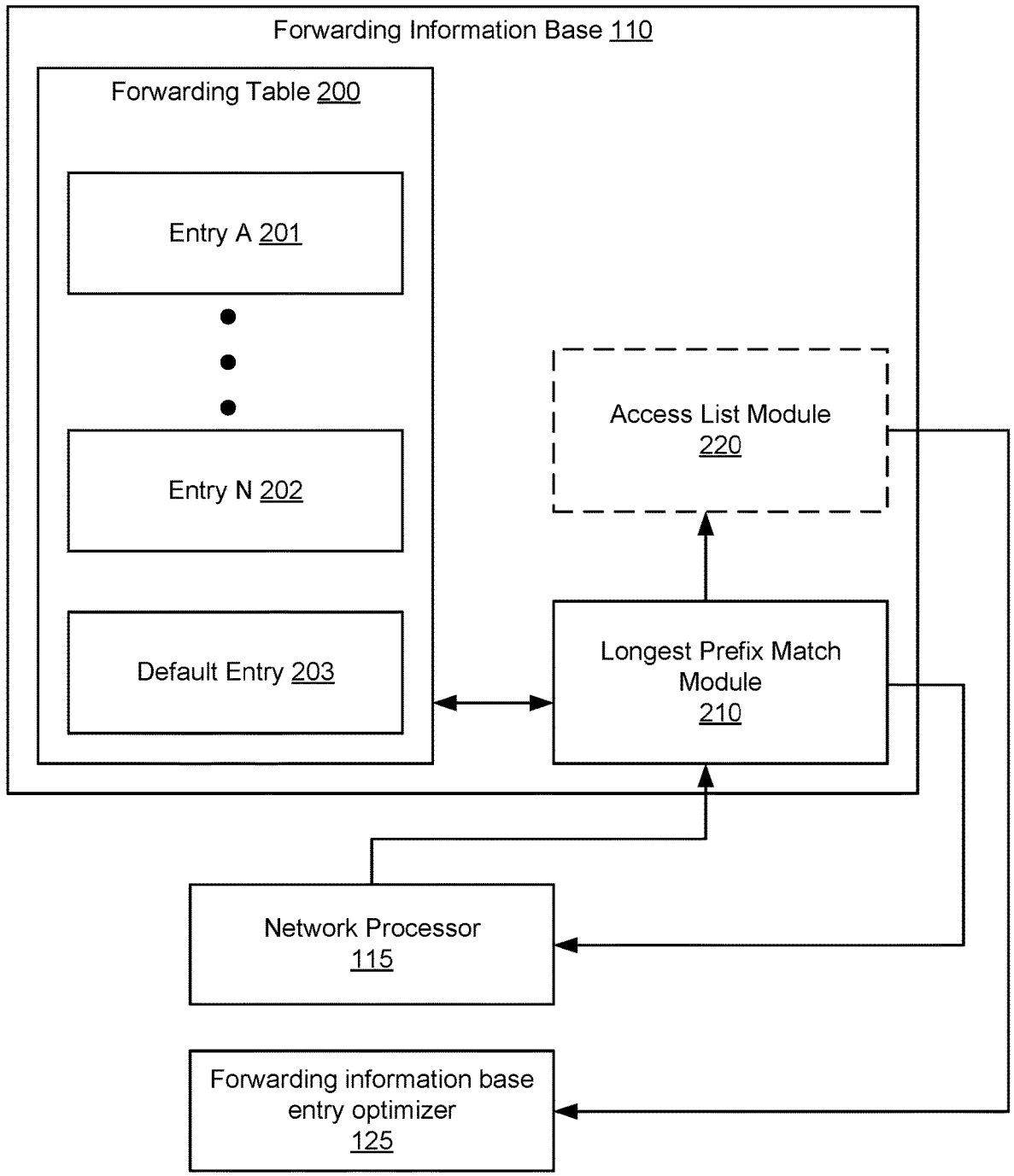
FIG. 2B shows a FIB accordance with one or more embodiments of the invention.

In one embodiment of the invention, the FIB (110) may be an embedded hardware device including one or more programs executing on the embedded hardware device of the network device and a forwarding table (200) stored on the embedded hardware device as shown in FIG. 2B. The embedded hardware device may be, for example, an ASIC. To improve the rate of packet forwarding, the FIB may operate in a data plane of the network device. By operating in the data plane, the computational cost of performing packet forwarding may be reduced when compared to a FIB operating in the control plane. The one or more programs and forwarding table (200) of the FIB are described below.

The forwarding table (200) may be a data structure that includes information to resolve the next-hop of any to-be-forwarded packet. More specifically, each entry (201-202) of the FIB may include information to identify the next-hop of a received packet. In one or more embodiments of the invention, each entry of the forwarding information base (110) may include an Internet Protocol (IP) prefix (e.g., represented using classless inter-domain routing (CIDR) notation) and next-hop information (e.g., the next-hop or information to determine the next-hop). The next-hop information may be specified using a Media Access Address (MAC) address and an egress port.

In one or more embodiments of the invention, the forwarding table (200) may include indexes or references to information to resolve the next-hop of any to-be-forwarded packet rather than the actual information to resolve the next-hop of any to-be-forwarded packet. For example, the next-hop of any to-be-forwarded packet may be stored in a different table than the forwarding table (200) and the entries of the forwarding table (200) may provide indexes, pointers, or references to the different table.

The forwarding table (200) may not include entries for all possible IP prefixes of to-be-forwarded packets. The forwarding table (200) may include a default entry (203) to which all IP prefixes that do not match to any of the entries (201-202) are matched. The default entry (203) may include next-hop information specified using a Media Access Address (MAC) address and an egress port.

The one or more programs of the FIB (110) may include a longest prefix match module (210) and/or an access list module (220). The aforementioned programs may include functionality to determine next hop information of a packet based on the information included in the forwarding table (200) and to notify the FIB entry optimizer (125) when entries of the forwarding table are accessed. Each are described below.

The longest prefix match module (210) may provide functionality to match prefixes of to-be-forwarded packets to entries (201-202) of the forwarding table (200). As noted above, each of the entries (201-202) may include an IP prefix in CIDR format and therein a prefix of a to-be-forwarded packet may match multiple entries (201-202) of the forwarding table (200). The longest prefix match module (210) may provide functionality to determine the entry (201-202) including the longest prefix that matches the prefix of the to-be-forwarded packet, e.g., the most specific route prefix. If a prefix of a to-be-forwarded packet does not match any of the entries (201-202) of the forwarding table (200), the longest prefix match module (210) may determine that the default entry (203) is the match.

The access list module (220) may be a program executing on the network device and include instructions that include functionality to notify control-plane entities of entries of the forwarding table (200) that are accessed. The access list module (220) may be configurable, by control-plane entities, to provide notifications of accesses of one or more entries and/or the default entry of the forwarding table (200). For example, the access list module (220) may be configured by the FIB entry optimizer (125) to notify the FIB entry optimizer of accesses of the default entry of the forwarding table. Notifications generated by the access list module (220) may include a prefix of a to-be-forwarded packet that triggered the longest prefix match module (210) to access an entry and/or the default entry of the forwarding table.

Returning to FIG. 2A, the forwarding table of the FIB may be programmed by the FIB entry optimizer (125). The FIB entry optimizer (125) may be executing on the network device (10) as shown in FIG. 2A. The forwarding information base entry optimizer (125) may be executing on a device that is external to the network device without departing from the invention.

In one or more embodiments of the invention, the forwarding information base entry optimizer (125) may be configured to rank entries of the forwarding table of the FIB. The ranking may be based on an access rate of the entries. For example, when the network device receives a to-be-forwarded packet, the network processor of the network device may forward a routing prefix of the to-be-forwarded packet to the longest prefix match module. In response, the longest prefix match module may access entries of the FIB to determine how to forward the packet. The rate of accessing an entry of the FIB may indicate a quantity of network traffic that is utilizing a particular route. Thus, the rate of accessing an entry of the FIB may indicate an importance of the entry of the FIB. A lower rate of access may indicate a less important route and a high access rate may indicate a more important route. Methods of determining an access rate and/or ranking entries of the FIB by the FIB entry optimizer are further described with respect to FIG. 3.

In one or more embodiments of the invention, the forwarding information base entry optimizer (125) may be configured to rank entries of the RIB that are not associated with any entry of the FIB. The ranking may be based on an estimated access rate of the entries of the RIB. For example, when the network device receives a to-be-forwarded packet, the network processor of the network device may forward a routing prefix of the to-be-forwarded packet to the longest prefix match module. In response, the longest prefix match module may access entries of the FIB to determine how to forward the packet. If the route prefix does not match any entry of the FIB, the longest prefix match module may determine the default entry matches the route prefix of the to-be-forwarded packet and may provide the next hop information of the default entry to the network processor. Providing default information to the network processor may indicate an importance of an entry of the RIB that would match to the route prefix of the packet if included in the FIB. Methods of determining an estimated access rate and/or ranking entries of the RIB by the FIB entry optimizer are further described with respect to FIG. 4.

In one or more embodiments of the invention, the forwarding information base entry optimizer (125) may be configured to program entries of the FIB based on rankings of entries of the FIB and rankings of entries of the RIB that are not associated with any entry of the FIB. The FIB entry optimizer may deprogram entries of the FIB and/or program entries of the FIB based on the rankings of the entries of the RIB and/or FIB. Methods of deprogramming and/or programming entries of the FIB based on rankings of the FIB and/or RIB entries by the FIB entry optimizer are further described with respect to FIG. 5.

In one embodiment of the invention, the network device (10) may also include a RIB mirror (130). The RIB mirror (130) may be a data structure that mirrors the entries of the RIB, indicates whether each entry of the RIB mirror is programmed into the FIB, and/or indicates a ranking of each entry of the RIB mirror. The RIB mirror (130) may be used by the FIB entry optimizer (125) to program and/or deprogram entries of the FIB. The RIB mirror (130) may operate in a control plane of the network device and be stored on the network device.

In one embodiment of the invention, the FIB entry optimizer (125) may use the RIB to program and/or deprogram entries of the FIB. For example, the FIB entry optimizer (125) may store information that identifies each entry of the RIB has an associated entry of the FIB and/or rankings of each entry of the RIB on a storage of the network device. In such cases, the network device may not include a RIB mirror (130).

In one or more embodiments of the invention, the network device (10) may include a traffic agent (111). The traffic agent (111) may be a program executing on the network device operating in the data plane of the network device. The traffic agent (111) may include functionality to sample network traffic and provide samples and/or statistical information related to the traffic to one or more control plane entities. The traffic agent (111) may be configurable by control plane entities to sample specific traffic and/or provide customized notifications relating to the traffic. For example, the traffic agent (111) may be configured by the FIB entry optimizer (125) to sample traffic being forwarded to a next-hop associated with one or more entries and/or the default entry of the forwarding table of the FIB.

Those skilled in the art will appreciate that the invention is not limited to the architecture shown in FIGS. 1-2B.

Figure 3:
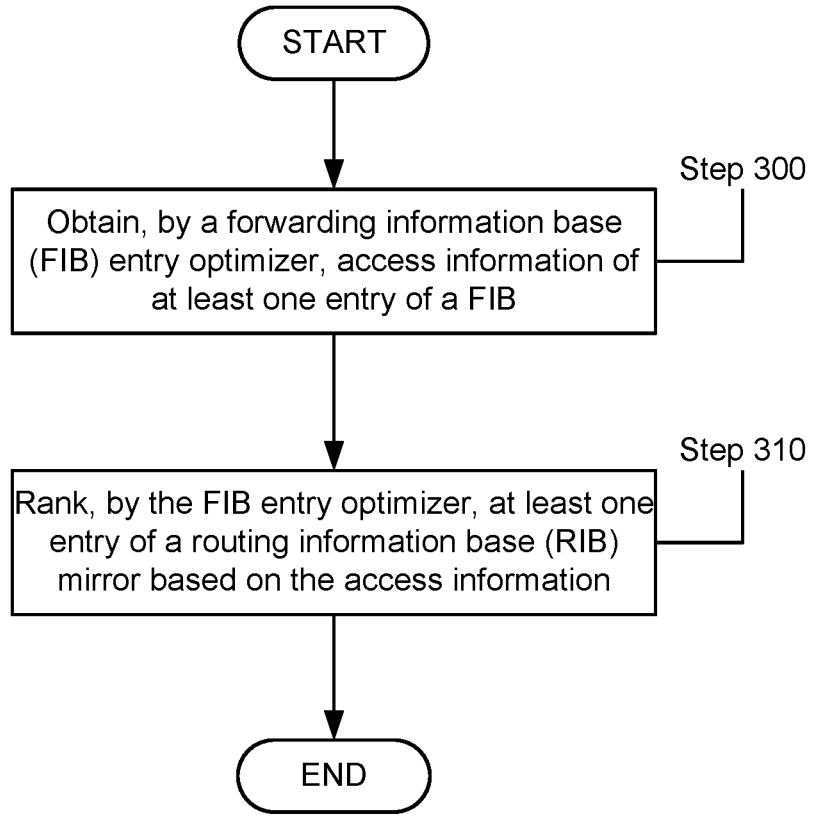
FIG. 3 shows a flowchart of a method of ranking routes that are not programmed in the FIB in accordance with one or more embodiments of the invention.
Figure 4:
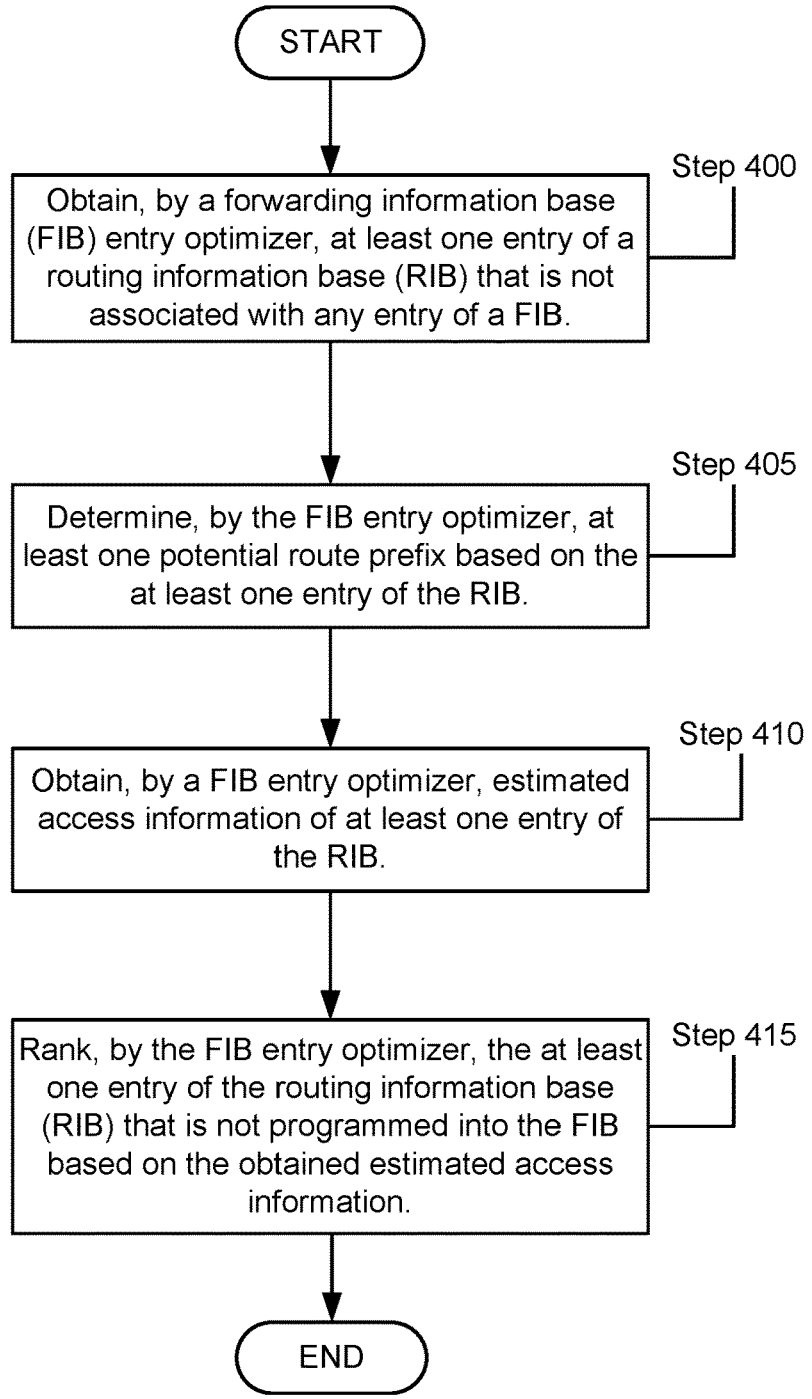
FIG. 4 shows a flowchart of a method of ranking routes that are programmed in the FIB in accordance with one or more embodiments of the invention.
Figure 5:
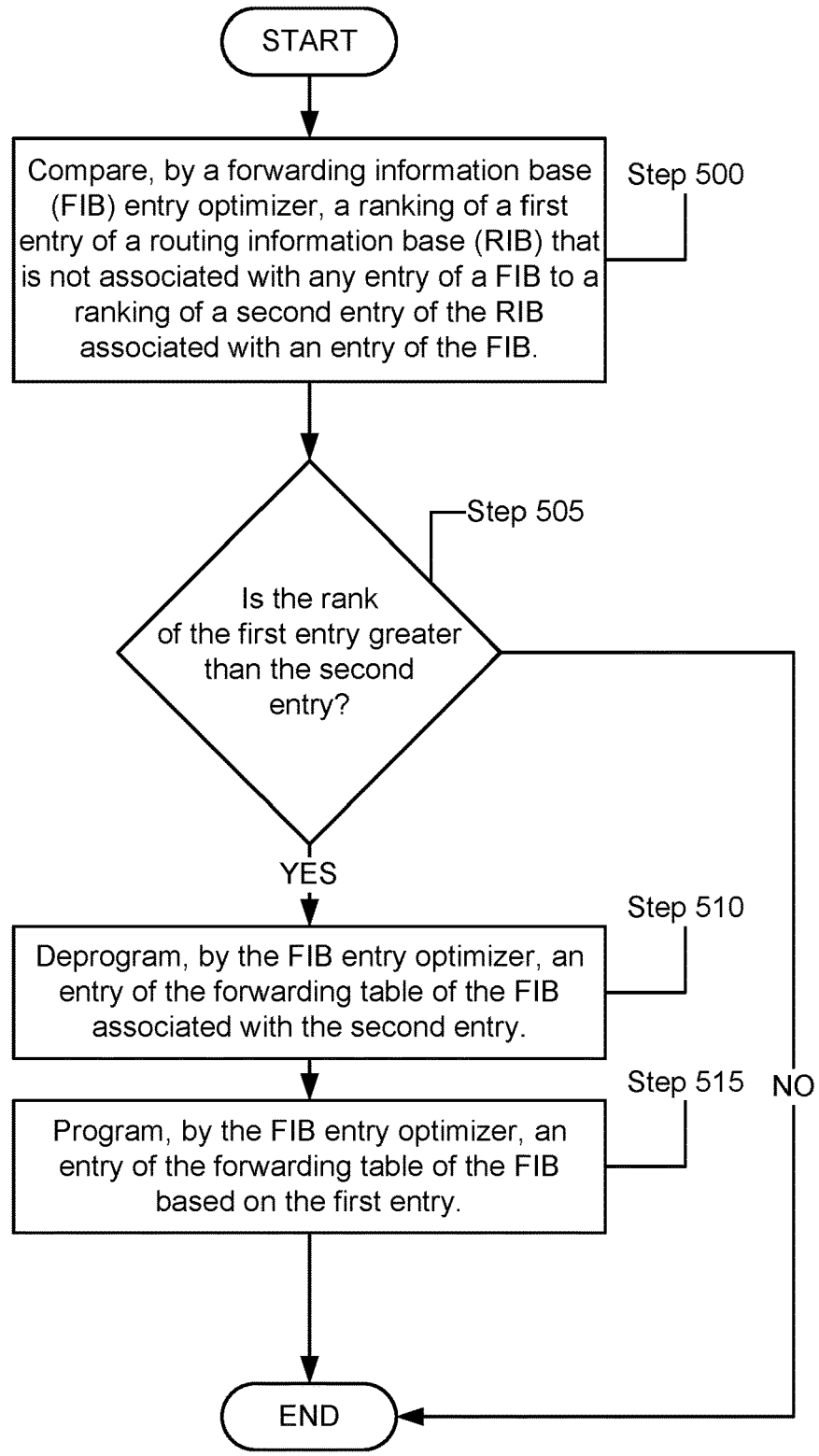
FIG. 5 shows a flowchart of a method of programming a FIB based on route rankings in accordance with one or more embodiments of the invention.

In the following flowcharts and action diagrams, functionality of components of the system shown in FIGS. 1-2B will be described. The functionality shown in the following figures may enable, for example, entries of a forwarding table of a FIB of a network device to be programmed and/or deprogrammed. FIGS. 3-5 show flowcharts of methods that may be performed, for example, by a network device. The methods shown in FIGS. 3-5 may be performed sequentially, in parallel, and/or multiple instances of the methods may be performed at the same time.

FIG. 3 shows a flowchart according to one or more embodiments of the invention. The method depicted in FIG. 3 may be used to rank entries of a forwarding table of a FIB of a network device in accordance with one or more embodiments of the invention. One or more steps shown in FIG. 3 may be omitted, repeated, and/or performed in a different order among different embodiments.

In Step 300, a FIB entry optimizer obtains access information of at least one entry of a FIB. The FIB entry optimizer may be a component of a network device as illustrated in FIG. 2.

In one or more embodiments of the invention, the FIB entry optimizer may obtain access information by configuring an access list module of a FIB to notify the FIB entry optimizer when one or more entries of the forwarding table of the FIB is accessed. The access list module may be configured by the FIB to notify the FIB entry optimizer of the prefix of a to-be-forwarded packet that caused the one or more entries to be accessed. For example, the FIB entry optimizer may configure the access list module to notify the FIB entry optimizer of accesses of any of the entries of the forwarding table.

In one or more embodiments of the invention, the FIB entry optimizer may configure the access list module to sample the accesses of the forwarding table and notify the FIB entry optimizer of the samples. For example, the FIB entry optimizer may configure the access list module to notify the FIB entry optimizer of one out of every 1000 accesses of the forwarding table.

In one or more embodiments of the invention, the FIB entry optimizer may obtain access information by configuring a traffic agent of the network device to sample the network traffic being forwarded by the network device and notify the FIB entry optimizer of the routing prefixes of the samples. Based on the routing prefixes of the samples, the FIB entry optimizer may determine accesses of the forwarding table, e.g., packets that are being forwarded are forwarded based on the next-hop information stored in the forwarding table and inherently require an access of the forwarding table to be forwarded. The traffic agent may, for example, be an S-flow agent that generates and provides data-grams to the FIB entry optimizer.

In response to configuring the access list module and/or the traffic agent, the FIB entry optimizer may wait a predetermined period of time. During the predetermined time, the FIB entry optimizer may receive notifications from the access list module or traffic agent of routing prefixes. The FIB entry optimizer may store the route prefixes received from the access list module or traffic agent.

In Step 310, the FIB entry optimizer ranks at least one entry of a RIB mirror, associated with the at least one entry of the forwarding table of the FIB, based on the access information. For each access information, e.g., a route prefixes, obtained in Step 300, the FIB entry optimizer may increment a rank of the RIB mirror that includes the route prefix. In other words, the FIB entry optimizer may assign a rank to each entry of the RIB mirror based on the access frequency by associated entries of the forwarding table of the FIB that are accessed. The FIB entry optimizer may store each rank in the RIB mirror. Following Step 310, the method may end.

The process of ranking entries of the forwarding table of the FIB by the method shown in FIG. 3 is further described using an explanatory example. The following example is for explanatory purposes and is not intended to limit the scope of the technology.

Example 1

A forwarding table of a FIB of a network device may include four entries and a default entry. Each of the four entries may include a first route prefix, second route prefix, third route prefix, or a fourth route prefix, respectively.

A FIB entry optimizer of the forwarding table may configure an access list module of the FIB to notify the FIB entry optimizer of every access of the first entry and fourth entry of the forwarding table of the FIB. The FIB entry optimizer may then wait for a predetermined period of time. In one or more embodiments of the invention, the predetermined period of time is between 0.1 and 10 milliseconds. In one or more embodiments of the invention, the predetermined period of time is a one millisecond period.

During the predetermined period of time, the network device may receive five packets. The packets may include a first route prefix, the first route prefix, a third route prefix, a fourth route prefix, and a sixth route prefix, respectively. The access list module of the FIB may forward the first route prefix, the first route prefix, and the fourth route prefix to the FIB entry optimizer in response to receiving the packets.

The FIB entry optimizer may increment a ranking of an entry of RIB mirror of the network device having the first route prefix in response to receiving the first route prefix. The FIB entry optimizer may increment the ranking of the entry of RIB mirror of the network device having the first routing prefix a second time in response to receiving the first route prefix a second time. The FIB entry optimizer may increment a ranking of another entry of RIB mirror of the network device having the fourth routing prefix in response to receiving the fourth route prefix.

Thus, as illustrated in example 1, the FIB entry optimizer in accordance with one or more embodiments of the invention may obtain access information of entries of a FIB and rank corresponding entries of the RIB mirror. In a case where the network device does not include a RIB mirror, rankings may be stored in a memory of the network device and associated with entry of a RIB of the network device. Ranking the entries may determine a relative importance for performing traffic forwarding for entries of the RIB that are programmed into the FIB, e.g., higher ranked entries may be more important and lower ranked entries may be less important.

The method shown in FIG. 3 may enable a network device to rank the importance of entries that are included in the FIB. Some routes between the network device and other network infrastructure may not be located in the forwarding table of the FIB.

FIG. 4 shows a flowchart according to one or more embodiments of the invention. The method depicted in FIG. 4 may be used to rank entries of a RIB or RIB mirror of a network device that are not associated with any entry of a forwarding table of a FIB in accordance with one or more embodiments of the invention. One or more steps shown in FIG. 4 may be omitted, repeated, and/or performed in a different order among different embodiments.

In Step 400, a FIB entry optimizer obtains at least one entry of a RIB or RIB mirror that does not have an associated entry in a forwarding table of the FIB. The FIB entry optimizer may be a component of a network device as illustrated in FIG. 2.

In one or more embodiments of the invention, the FIB entry optimizer may obtain one or more entries of the RIB or RIB mirror by selecting or randomly selecting one or more entries of the RIB or RIB mirror that do not have associated entries in the FIB, e.g., entries of the RIB or RIB mirror that are not in the forwarding table of the FIB.

In Step 405, the FIB entry optimizer determines at least one potential route prefix based on the obtained at least one entry of the RIB or RIB mirror. The potential route prefixes may be the route prefix of the at least one entry of the RIB or RIB mirror.

In Step 410, the FIB entry optimizer obtains estimated access information of at least one entry of a RIB or RIB mirror. The estimated access information may be a quantification, e.g., a rate, of the number of times an entry of the RIB that is not programmed into the forwarding table of the FIB would be accessed if the entry of the RIB were programmed into the forwarding table of the FIB during a predetermined period of time.

In one or more embodiments of the invention, the FIB entry optimizer may obtain estimated access information by configuring an access list module of a FIB to notify the FIB entry optimizer when a default entry of the forwarding table of the FIB is accessed. The access list module may be configured by the FIB entry optimizer to notify the FIB entry optimizer of the prefix of a to-be-forwarded packet that caused the default entry to be accessed.

In one or more embodiments of the invention, the FIB entry optimizer may configure the access list module to sample the accesses of the default entry of the forwarding table and notify the FIB entry optimizer of the samples. For example, the FIB entry optimizer may configure the access list module to notify the FIB entry optimizer of one out of every 1000 accesses of the default entry of the forwarding table.

In one or more embodiments of the invention, the FIB entry optimizer may obtain access information by configuring a traffic agent of the network device to sample the network traffic being forwarded by the network device and notify the FIB entry optimizer of the routing prefixes of the samples. Based on the routing prefixes of the samples, the FIB entry optimizer may determine an estimated access information of an entry of a RIB of the forwarding table, e.g., packets that are being forwarded a routing prefix, any routing prefix of a packet that corresponds to a routing prefix of an entry of a RIB that is not programmed into the FIB indicates an estimated access information. The traffic agent may, for example, be an S-flow agent that generates and provides data-grams to the FIB entry optimizer.

In response to configuring the access list module and/or the traffic agent, the FIB entry optimizer may wait a predetermined period of time. During the predetermined time, the FIB entry optimizer may receive notifications from the access list module or traffic agent of routing prefixes. The FIB entry optimizer may store the route prefixes received from the access list module or traffic agent.

In Step 415, the FIB entry optimizer ranks at least one entry of a RIB or RIB mirror that is not programmed into the forwarding table of the FIB based on the obtained estimated access information. For each estimated access information, e.g., route prefixes, obtained in Step 410, the FIB entry optimizer may increment a rank of an entry of the RIB or RIB mirror that includes the route prefix. In other words, the FIB entry optimizer may assign a rank to each entry of the RIB or RIB mirror based on the frequency a routing prefix of an entry of a RIB or RIB mirror that is not programmed into the forwarding table of the FIB as if the entry was programmed into the forwarding table of the FIB. The FIB entry optimizer may store each rank in the RIB mirror or a storage of the network device. Following Step 415, the method may end.

The process of rank entries of a RIB or RIB mirror of a network device that are not associated with any entry of a forwarding table of a FIB by the method shown in FIG. 4 is further described using an explanatory example. The following example is for explanatory purposes and is not intended to limit the scope of the technology.

Example 2

A RIB mirror of a network device may include seven entries and a default entry. Each of the seven entries may include a first route prefix, second route prefix, third route prefix, a fourth route prefix, a fifth route prefix, a sixth route prefix, or a seventh route prefix, respectively.

A FIB entry optimizer of the forwarding table may configure an access list module of the FIB to notify the FIB entry optimizer of every access of the default entry of the forwarding table of the FIB. The FIB entry optimizer may then wait for a one millisecond period.

During the one millisecond period, the network device may receive five packets. The packets may include a first route prefix, a first route prefix, a third route prefix, a seventh route prefix, and a sixth route prefix, respectively. The access list module of the FIB may forward the seventh route prefix and the sixth route prefix to the FIB entry optimizer in response to receiving the packets.

The FIB entry optimizer may increment a ranking of the seventh entry of RIB mirror of the network device in response to receiving the seventh route prefix. The FIB entry optimizer may increment the ranking of the sixth entry of the RIB mirror of the network device in response to receiving the sixth route prefix.

Thus, as illustrated in example 2, the FIB entry optimizer in accordance with one or more embodiments of the invention may obtain access information of the default entry of the forwarding table of the FIB and rank entries of the RIB mirror based on the access information. In a case where the network device does not include a RIB mirror, rankings may be stored in a memory of the network device and associated with entries of the RIB of the network device. Ranking the entries may determine a relative importance for performing traffic forwarding for entries of the RIB that are not programmed into the FIB, e.g., higher ranked entries may be more important and lower ranked entries may be less important.

Thus, the methods shown in FIGS. 3 and 4 may enable a network device to rank the importance of entries RIB that are programmed into the forwarding table of the FIB and entries of the RIB that are not programmed into the FIB. Based on the determined rankings of the entries of the RIB, the FIB entry optimizer may program the forwarding table of the FIB.

FIG. 5 shows a flowchart according to one or more embodiments of the invention. The method depicted in FIG. 5 may be used to program an entry of a forwarding table of a FIB in accordance with one or more embodiments of the invention. One or more steps shown in FIG. 5 may be omitted, repeated, and/or performed in a different order among different embodiments.

In Step 500, a FIB entry optimizer compares a ranking of a first entry of a RIB that is not associated with any entry of a FIB to a ranking of a second entry of the RIB that has an associated entry of the FIB. The FIB entry optimizer may be a component of a network device as illustrated in FIG. 2. The rankings of the entries of the RIB may be determined by the methods of FIGS. 3 and 4. The rankings may be stored in a RIB mirror or a storage of a network device.

In Step 505, the FIB entry optimizer determines whether the ranking of the first entry is greater than the ranking of the second entry based on the comparison. If the ranking of the first entry is greater than the ranking of the second entry, the method may proceed to Step 510. If the ranking of the first entry is less than the ranking of the second entry, the method may end.

In Step 510, the FIB entry optimizer deprograms an entry of a forwarding table of the FIB associated with the second entry of the RIB. The FIB entry optimizer may deprogram the entry of the forwarding table by deleting the contents of the entry of the forwarding table associated with the second entry.

In Step 515, the FIB entry optimizer programs an entry of the forwarding table of the FIB based on the first entry. The FIB entry optimizer may program the entry of the forwarding table by adding a routing prefix and next-hop information to an entry of the forwarding table of the FIB based on information included in the first entry of the RIB.

Following Step 515, the method may end.

In one or more embodiments of the invention, the method shown in FIG. 5 may be used to program any number of entries of a forwarding table of a FIB. For example, the method of FIG. 5 may be used to program all of the entries of the forwarding table of the FIB, a subset of the entries of the forwarding table of the FIB, or none of the entries.

In one or more embodiments of the invention, the method shown in FIG. 5 may be used to deprogram entries of a forwarding table of a FIB by, for example, omitting Step 515. Additionally, rather than being compared to a ranking of a first entry of a RIB in Step 505, the ranking of the second entry may be compared to a predetermined value, e.g., a minimum rank, rather than the ranking of the first entry. In other words, entries of the forwarding table of the FIB may be deprogrammed if the rankings of associated entries of the RIB are less than a minimum value.

The process of programming an entry of a forwarding table of a FIB by the method shown in FIG. 5 is further described using explanatory examples. The following examples are for explanatory purposes and are not intended to limit the scope of the technology.

Example 3

A RIB mirror of a network device may include 10 entries. The first five entries may be associated with entries of a forwarding table of a FIB. The 10 entries may have ranks of 1, 2, 3, 1, 2, 4, 3, 2, 1, and 1, respectively.

A FIB entry optimizer may compare the tenth entry having a rank of 1 to the second entry having a rank of 2. Based on the comparison, the FIB entry optimizer may determine that the rank of the tenth entry is not greater than the rank of the second entry. Based on the determination, the FIB entry may not program or deprogram any entries of the forwarding table of the FIB.

Example 4

A RIB mirror of a network device may include 10 entries. The first five entries may be associated with entries of a forwarding table of a FIB. The 10 entries may have ranks of 1, 2, 3, 1, 2, 4, 3, 2, 1, and 1, respectively.

A FIB entry optimizer may compare the sixth entry having a rank of 4 to the second entry having a rank of 2. Based on the comparison, the FIB entry optimizer may determine that the rank of the sixth entry is greater than the rank of the second entry.

In response to the determination, the FIB entry optimizer may deprogram an entry of the forwarding table of the FIB associated with the second entry of the RIB mirror.

In response to deprogramming the second entry, the FIB entry optimizer may program an entry of the forwarding table of the FIB based on the sixth entry of the RIB mirror.

Example 5

A RIB mirror of a network device may include 10 entries. The first five entries may be associated with entries of a forwarding table of a FIB. The 10 entries may have ranks of 1, 2, 3, 1, 2, 4, 3, 2, 1, and 1, respectively. A minimum ranking of 2 may be set by a user.

A FIB entry optimizer may compare the first entry of the RIB mirror having a value of 1 to the minimum ranking of 2. Based on the comparison, the FIB entry optimizer may determine that the rank of the first entry is less than the minimum ranking of 2.

In response to the determination, the FIB entry optimizer may deprogram an entry of the forwarding table of the FIB associated with the first entry of the RIB mirror.

The FIB entry optimizer may compare the second entry of the RIB mirror having a value of 2 to the minimum ranking of 2. Based on the comparison, the FIB entry optimizer may determine that the rank of the second entry is equal to the minimum ranking of 2.

In response to the determination, the FIB entry optimizer may not deprogram an entry of the forwarding table of the FIB associated with the second entry of the RIB mirror.

The FIB entry optimizer may compare the third entry of the RIB mirror having a value of 3 to the minimum ranking of 2. Based on the comparison, the FIB entry optimizer may determine that the rank of the third entry is greater than the minimum ranking of 2.

In response to the determination, the FIB entry optimizer may not deprogram an entry of the forwarding table of the FIB associated with the third entry of the RIB mirror.

The FIB entry optimizer may compare the fourth entry of the RIB mirror having a value of 1 to the minimum ranking of 2. Based on the comparison, the FIB entry optimizer may determine that the rank of the fourth entry is less than the minimum ranking of 2.

In response to the determination, the FIB entry optimizer may deprogram an entry of the forwarding table of the FIB associated with the fourth entry of the RIB mirror.

One or more embodiments of the invention may enable one or more of the following: i) ranking of entries of a RIB mirror based on access information of associated entries of a forwarding table of FIB may enable a network device to determine the relative importance of entries of the RIB that are programmed into the FIB, ii) ranking entries of the RIB mirror based on access information of a default entry of the forwarding table of the RIB mirror may enable the network device to determine the relative importance of entries of the RIB that are not programmed into the FIB, iii) programming the entries of the forwarding table of the FIB based on the relative importance of the entries of the RIB may improve forwarding performance by forwarding a larger percentage of received network traffic along a more optimized route, e.g., decreasing the percentage of received network traffic that is forwarded based on the default entry of the forwarding table of the FIB, and iv) forwarding more network traffic along more optimized routes, e.g., increasing the percentage of received network traffic that is forwarded based on entries of the forwarding table rather than the default route, may improve the total quantity of network traffic a network incorporating network devices that operate in accordance with one or more embodiments of the invention are able to route.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of programming a forwarding information base (FIB), comprising:
 configuring an access list module of the FIB to:
  sample accesses of a default entry of a forwarding table, and issuing notifications based on the sampling;
after the configuring:
  receiving at least one notification specifying access to the default entry;
  updating a first ranking in response to receiving the at least one notification, wherein the first ranking is associated with a first entry of a routing information base (RIB) not associated with any entry of a forwarding table of the FIB;
  comparing the updated first ranking to a second ranking of a second entry of the RIB that is associated with a first entry of the forwarding table of the FIB;
  making a first determination that the first ranking is greater than the second ranking based on the comparison;
  deprogramming the first entry of the FIB in response to the first determination; and
  programming a first new entry of the FIB based on the first entry of the RIB.

2. The method of claim 1, further comprising:
comparing a third ranking of a third entry of the RIB not associated with any entry of the forwarding table of the FIB to the first ranking of the first entry of the RIB that is associated with the first new entry of the forwarding table of the FIB;
making a second determination that the third ranking is greater than the first ranking based on the comparison;
deprogramming the first new entry of the forwarding table of the FIB in response to the first determination; and
programming a second new entry of the forwarding table of the FIB based on the third entry of the RIB.

3. The method of claim 1, further comprising:
comparing a third ranking of a third entry of the RIB not associated with any entry of the forwarding table of the FIB to the first ranking of the first entry of the RIB that is associated with the first new entry of the forwarding table of the FIB;
making a second determination that the third ranking is less than the first ranking based on the comparison;
making a third determination that no entry of the forwarding table of the FIB is to be deprogrammed based on the second determination.

4. The method of claim 1, wherein the default entry comprises a next-hop, wherein the default entry matches any packet including a routing prefix that does not match any other entry of the forwarding table of the FIB.

5. The method of claim 1, further comprising:
configuring a traffic agent to sample network traffic and issue notifications based on the sampling.

6. The method of claim 1, wherein the second ranking is based on, at least in part, an estimated access information of the second entry.

7. The method of claim 6, wherein the estimated access information is based on, at least in part, on an access rate of the first entry of the forwarding table of the FIB associated with the second entry of the RIB.

8. The method of claim 7, wherein the first entry of the forwarding table of the FIB comprises a routing prefix and a next-hop, wherein the first entry of the forwarding table of the FIB matches any packet including a routing prefix that matches the routing prefix of the first entry of the forwarding table of the FIB.

9. The method of claim 7, wherein the access rate is determined by:
configuring an access list module to issue notifications about route prefixes that cause accesses of the first entry of the forwarding table of the FIB;
receiving at least one notification comprising a route prefix that cause accesses of the first entry of the forwarding table of the FIB; and
incrementing the second ranking in response to receiving the at least one notification.

10. The method of claim 9, further comprising:
configuring the access list module to sample the accesses of the first entry of the forwarding table and issue notifications based on the sampling.

11. The method of claim 7, wherein the access rate is determined by:
configuring a traffic agent to issue notifications about network traffic associated with the second entry of the RIB;
receiving at least one notification; and
incrementing the second ranking in response to receiving the at least one notification.

12. The method of claim 11, further comprising:
configuring the traffic agent to sample the network traffic associated with the first entry of the forwarding table and issue notifications based on the sampling.

13. A method of programming a forwarding information base (FIB), comprising:
sampling a plurality of accesses to a default entry in the FIB to obtain a plurality of prefixes of to-be forwarded packets that caused the default entry to be accessed;
ranking, using the plurality of prefixes of to-be forwarded packets that caused the default entry to be accessed, a plurality of entries in a routing information base (RIB), wherein none of the plurality of entries in the RIB is associated with any entry of a forwarding table in the FIB; and
updating, based on the ranking, the forwarding table of the FIB.

14. The method of claim 13, further comprising:
configuring an access list module of the FIB to sample accesses of the default entry and issuing notifications based on the sampling, wherein the notifications comprise at least one of the plurality of prefixes of to-be forwarded packets that caused the default entry to be accessed.

15. The method of claim 13,
wherein updating the forwarding table of the FIB comprises programming a new entry into the forwarding table,
wherein the new entry comprises one of the plurality of prefixes of the to-be forwarded packets that caused the default entry to be accessed.

16. The method of claim 15, further comprising:
deprogramming an entry from the forwarding table of the FIB prior to programming the new entry into the forwarding table.

17. The method of claim 13,
wherein updating the forwarding table of the FIB comprises programming a new entry into the forwarding table,
wherein the new entry is one of the plurality of RIB entries that comprises one of the plurality of prefixes of the to-be forwarded packets that caused the default entry to be accessed.

18. The method of claim 17, further comprising:
deprogramming an entry from the forwarding table of the FIB prior to programming the new entry into the forwarding table.

19. The method of claim 18,
wherein the one of the plurality of RIB entries is associated with a rank determined during the ranking,
wherein the entry is associated with a second rank, and
wherein the rank is greater than the second rank.

20. The method of claim 13, wherein the default entry comprises a next-hop, wherein the default entry matches any packet including a routing prefix that does not match any other entry of the forwarding table of the FIB.

\* \* \* \* \*